United States Patent Office 2,833,742
Patented May 6, 1958

2,833,742

ROOM TEMPERATURE CURING SILOXANE ELASTOMERS WITH POLYSILICATE AND AMINE-ALDEHYDE PRODUCT

Robert J. Koch, Midland, Mich., assignor to Dow Corning Corporation, Midland, Mich., a corporation of Michigan No Drawing. Application October 5, 1955
Serial No. 538,801

5 Claims. (Cl. 260—46.5)

This invention relates to elastomers composed of siloxane polymers, alkylpolysilicates and curing catalysts.

The need for improved room temperature curing siloxane elastomers has been steadily increasing in the past years. To date the most satisfactory elastomers were those which comprise a combination of a siloxane polymer, ethylpolysilicate and a metal salt of a carboxylic acid. These compounds have met with considerable commercial success but there is need for an even faster curing combination. This is true because there are applications in which a very short setting time of the compounded material is desirable. For example, in impregnating intricate structures it is necessary to employ a low viscosity impregnant which will penetrate into the structure and there set. Inasmuch as a low viscosity material is employed it tends to leak out of the structure unless the setting takes place at a very rapid rate.

It is the object of this invention to provide novel room temperature curing siloxane elastomers which have a faster setting time than those previously known. Other objects and advantages will be apparent from the following description.

This invention relates to elastomeric materials consisting essentially of (1) an acid-free organopolysiloxane of at least 1 cs. viscosity at 25° C., said siloxane having the unit formula

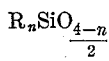

where R is of the group monovalent hydrocarbon radicals and halogenated monovalent hydrocarbon radicals and $n$ has an average value from 1.99-2 inclusive, (2) from .1-50% by weight based on the weight of the siloxane of a substantially non-volatile alkylpolysilicate in which the alkyl groups have less than 6 carbon atoms and (3) from .01-10% by weight based on the weight of the polysiloxane of a condensation product of an aliphatic aldehyde and an aliphatic primary amine, both of which contain less than 8 carbon atoms.

The acid-free siloxanes employed in this invention can contain, attached to the silicon atoms, any monovalent hydrocarbon radical and any halogenated monovalent hydrocarbon radical. The term "acid-free" as employed herein means that the siloxane polymer is free of acid groups such as ≡SiAc, where Ac is, for example, Cl, —OSO₃H, —OPO₃H₂, or —OPO₃HEt. The siloxanes employed in this invention are substantially diorgano-substituted siloxanes which may contain limited amounts of monoorgano-substituted siloxanes. Preferably the siloxanes should be substantially free from triorgano-siloxane units.

Specific examples of R groups which are operative in this invention are alkyl groups such as methyl, ethyl and octadecyl; cycloaliphatic groups such as cyclohexyl and cyclopentyl; aromatic hydrocarbon radicals such as phenyl, xenyl, and naphthyl; aralkyl groups such as benzyl; alkaryl groups such as tolyl and xylyl; unsaturated hydrocarbon radicals such as vinyl, allyl and cyclohexenyl and halogenated monovalent hydrocarbon radicals such as chloromethyl, bromophenyl, tetrafluoroethyl, trifluorovinyl, trifluorotolyl, hexafluoroxylyl, heptachloroxenyl, heptafluoropropyl, chlorodifluorovinyl, chlorohexafluorocyclopentenyl, 1 - bromo - 3 - tribromopropyl and

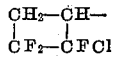

It is to be understood that the siloxanes employed herein can be either homopolymeric materials or copolymeric materials containing 2 or more different types of siloxane units and further that both organic radicals attached to any one silicon atom can be the same or the radicals attached to any one silicon atom can be different.

The polymeric siloxanes which are employed in this invention can range in viscosity from 1 cs. up. Thus, the polymers can be thin liquids or nonflowing benzene soluble gums or insoluble gels. The particular physical state of the polymer will vary depending upon the end use of the elastomer. Thus fluid polymers of the order of 50 to 25,000 cs. are preferred for those applications such as coating or potting. When excellent stress-strain properties are desired it is preferable to employ high molecular weight nonflowing soluble gums. In general, it is preferred that the polymers be soluble.

The polysilicates within the scope of this invention include any alkylpolysilicate in which the alkyl radical contains less than 6 carbon atoms. Specific examples of such silicates are methyl, ethyl, isopropyl, n-butyl and secondary amyl silicates. It is to be understood that mixtures of two or more silicates can be employed if desired. The silicates should be substantially free of volatile materials such as alcohols or alkylorthosilicates. Preferably the polysilicates should be liquid or toluene soluble. The polysilicates themselves are polymeric materials in which the silicon atoms are linked through Si—O—Si linkages, the remaining valences of the silicon being satisfied primarily by alkoxy radicals. Such materials are commercially available, although generally it is preferable to devolatilize the commercial products prior to use. This may be done by heating at reduced pressure at temperatures up to 250° C.

The catalyst for curing the compositions of this invention is any condensation product of any aliphatic aldehyde containing less than eight carbon atoms and any aliphatic amine containing less than eight carbon atoms. These condensation products are available commercially. In general they are prepared by reacting the corresponding alkyl chloride with ammonia and thereafter reacting the amine hydrochloride with the aldehyde. These condensation products are also known as aldehyde-amines.

Specific examples of operative catalysts are the condensation products of formaldehyde and methylamine; acetaldehyde and allylamine; crotonaldehyde and ethylamine; isobutyraldehyde and ethylamine; acrolein and butylamine; α,β-dimethylacrolein and amylamine; butyraldehyde and butylamine; acrolein and allylamine and formaldehyde and heptylamine.

For the purpose of this invention the catalysts should be employed in amounts from .01-10% by weight based on the weight of the polysiloxane. A mixture of two or more of the defined catalysts may be employed if desired. The specific amount of catalyst may be varied from compound to compound depending upon the activity of the specific compound in question and the particular use for which the product is to be used. For example, when a fast cure is desired more catalyst is required. If one wishes to delay the cure, for example, in applications where extensive fabrication is required less catalyst is used. In general, the preferred catalyst concentrations are from .2–2 parts by weight based on the weight of the siloxane.

If desired, fillers can be incorporated into the elastomers of this invention. Suitable fillers include organic materials such as cork, wood flour, cotton linters and organic fabrics or inorganic fillers such as calcuim carbonate, titania, carbon black and silica powders. The latter fillers are preferred in those applications requiring high temperature stability. If employed, the amount of filler may range from 10 to 300 or more parts by weight based on the weight of the polysiloxane.

The elastomers of this invention may be compounded in the usual manner for compounding siloxane elastomers. If the materials are to be stored prior to use, it is necessary that the aldehyde-amine condensation product catalyst or the polysilicate be stored separately. In other words, one may compound the polymer, filler and silicate and add the catalyst just prior to use or one may compound the polymer, filler and catalyst and then add the silicate just prior to use.

The latter method is particularly valuable in coating applications where a mixture of polymer, catalyst and if desired a filler, can be applied to the base member and thereafter a coating of the polysilicate can be applied in any convenient manner such as by brushing, spraying and the like. The polysilicate will diffuse into the polysiloxane coating and curing in situ will thereupon occur.

Curing of the elastomers of this invention takes place spontaneously at room temperature upon mixing the polysiloxane, polysilicate and catalyst. The curing in general will require from 20 minutes to 1 day at room temperature. If desired, the curing time can be increased by maintaining the mixture at a temperature below room temperature, for example, at 0° C. or the curing time can be decreased by employing elevated temperatures. It is to be understood, of course, that if desired, the elastomers of this invention can be cured in a press at temperatures of 150° C. to 250° C. The products can be hot or cold molded and extruded, although in carrying out extrusion operations care should be taken that the curing does not advance too far prior to extrusion.

The products of this invention are particularly adaptable for potting compounds. For example, a fluid polymer of say 100 cs. may be compounded with the polysilicate and if desired, enough filler so that the material can still be poured. The catalyst may then be added and the material poured into the container whereupon it will set in a matter of a few minutes to a rubbery material which will completely fill the voids in the apparatus.

The materials of this invention have heat stabilities comparable with that of previously known siloxane elastomers and better than previously known room temperature curing siloxane elastomers. This is exhibited by little reduction of physical properties after heating at 250° C. and also by low weight loss during heating.

The elastomers of this invention are useful for electrical insulation, for sealing of voids and for any other use where elastomeric products are needed.

The term "consisting essentially of" as employed in the claims means that the materials of this invention contain three essential ingredients namely the defined polysiloxanes, polysilicates and amine-aldehyde condensation products but that the claims include within their scope nonessential ingredients such as oxidation inhibitors, compression set additives, pigments and other specialized ingredients normally employed in siloxane elastomers.

The following examples are illustrative only and should not be construed as limiting the invention, the scope of which is properly delineated in the appended claims.

All parts are parts by weight unless otherwise specified.

*Example 1*

Two drops of a condensation product of ethylamine and formaldehyde sold under the name Trimene Base was added to a mixture of a 3 cs. hydroxylated dimethylpolysiloxane fluid containing 1% by weight ethylpolysilicate based on the weight of the fluid. The mixture set to a rubbery gel at room temperature.

*Example 2*

100 parts by weight of a dimethylpolysiloxane gum was mixed with 3 parts by weight ethylpolysilicate and 1 part by weight of the condensation product of ethylamine and formaldehyde known as Trimene Base. The mixture was allowed to stand at room temperature whereupon it gelled in about 20 minutes. The resulting product was a rubbery elastomeric material.

*Example 3*

This example shows the greater rapidity of the setting of the compositions of this invention as compared with those of the prior art. A master batch of material was made by mixing 100 parts of dimethylpolysiloxane gum with 3 parts by weight ethylpolysilicate. This mixture was divided into three portions. To portion A, 1 part by weight Trimene Base was added based on 100 parts by weight polymer. To another portion B, 1 part by weight butyltin-tri-2-ethylhexoate was added based on 100 parts by weight polymer. All three samples were allowed to stand at room temperature. After 1 hour, the sample containing the Trimene Base had become rubbery while the sample containing the butyltin-tri-2-ethylhexoate and the sample containing no catalyst were still soft and non-rubbery.

After 1 day the sample containing the Trimene Base was completely cured to a rubbery elastomeric material while the sample containing the butyltin-tri-2-ethylhexoate was just beginning to show signs of curing. The sample containing no catalyst showed no signs of curing.

*Example 4*

100 parts by weight of a dimethylpolysiloxane gum, 40 parts by weight of a finely divided silica filler, 3 parts by weight of ethylpolysilicate and 1 part by weight Trimene Base were mixed and cold molded and allowed to stand at room temperature. After 1 day the sample had a durometer of 49, a tensile strength of 605 p. s. i. and an elongation at break of 1080%.

*Example 5*

A room temperature curing elastomer is obtained when a 100 parts copolymer gum of 10 mol percent phenylmethylsiloxane and 90 mol percent dimethylsiloxane is milled with 2 parts methylpolysilicate and 1 part of a condensation product of heptaldehyde and heptylamine and allowed to stand at room temperature. Equivalent results are also obtained when a condensation of acrolein and allylamine is employed as the setting catalyst.

*Example 6*

Elastomers are obtained when 100 parts of the following siloxanes of 100,000 cs. viscosity are mixed with 2 parts of isopropylpolysilicate and 1 part of the condensation product of formaldehyde and ethylamine and thereafter allowed to stand at room temperature. The siloxanes are ethylmethylsiloxane, diethylsiloxane, octadecylmethylsiloxane, vinylmethylsiloxane, a copolymer of 99 mol percent dimethylsiloxane and 1 mol percent

a copolymer of 90 mol percent dimethylsiloxane and 10 mol percent

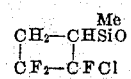

a copolymer of 95 mol percent dimethylsiloxane and 5 mol percent diphenylsiloxane and a copolymer of 80 mol percent diethylsiloxane, 10 mol percent tolylmethylsiloxane, 1 mol percent monophenylsiloxane and 9 mol percent cyclohexylmethylsiloxane.

That which is claimed is:

1. An elastomeric composition consisting essentially of (1) an organopolysiloxane free of silicon-bonded acid anions which produce acids on hydrolysis, said siloxane having a viscosity of at least 1 cs. at 25° C., said siloxane having the unit formula $$R_n SiO_{\frac{4-n}{2}}$$

where R is selected from the group consisting of monovalent hydrocarbon radicals and halogenated monovalent hydrocarbon radicals and $n$ has an average value from 1.99–2 inclusive, (2) from .1–50% by weight based on the weight of the siloxane of a substantially non-volatile alkylpolysilicate in which the alkyl groups have less than 6 carbon atoms and (3) from .01–10% by weight based upon the weight of the siloxane of the condensation product of an aliphatic aldehyde having less than eight carbon atoms and a primary aliphatic amine having less than eight carbon atoms.

2. An elastomer in accordance with claim 1 wherein the siloxane is a methylsiloxane.

3. An elastomeric composition consisting essentially of (1) an organopolysiloxane free of silicon-bonded acid anions which produce acids on hydrolysis, said siloxane having a viscosity of at least 1 cs. at 25° C., said siloxane having the unit formula $$R_n SiO_{\frac{4-n}{2}}$$

where R is selected from the group consisting of monovalent hydrocarbon radicals and halogenated monovalent hydrocarbon radicals and $n$ has an average value from 1.99–2 inclusive, (2) from .1–50% by weight based on the weight of the siloxane of a substantially non-volatile alkylpolysilicate in which the alkyl groups have less than 6 carbon atoms, (3) from .01–10% by weight based upon the weight of the siloxane of the condensation product of an aliphatic aldehyde having less than eight carbon atoms and an aliphatic primary amine having less than 8 carbon atoms and (4) a filler.

4. An elstomeric composition in accordance with claim 3 in which the siloxane is a methylsiloxane.

5. An elastomeric composition in accordance with claim 1 wherein the condensation product (3) is the condensation product of formaldehyde and ethylamine.

References Cited in the file of this patent

UNITED STATES PATENTS

| 2,541,137 | Warrick | Feb. 13, 1951 |
| 2,562,953 | Rust | Aug. 7, 1951 |